July 12, 1932.  P. R. GENZMER  1,867,450
TROLLEY BUCKET CONVEYER
Filed Jan. 14, 1932   3 Sheets-Sheet 1

INVENTOR
Paul R. Genzmer
BY Philip E. Liggus
ATTORNEY

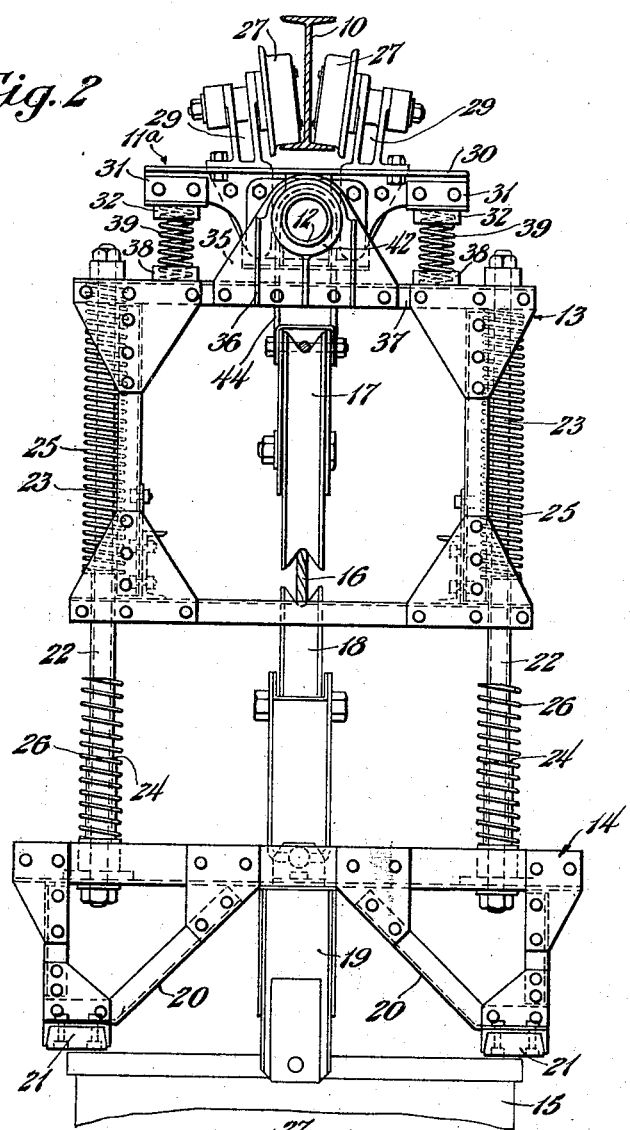

July 12, 1932.  P. R. GENZMER  1,867,450
TROLLEY BUCKET CONVEYER
Filed Jan. 14, 1932   3 Sheets-Sheet 3
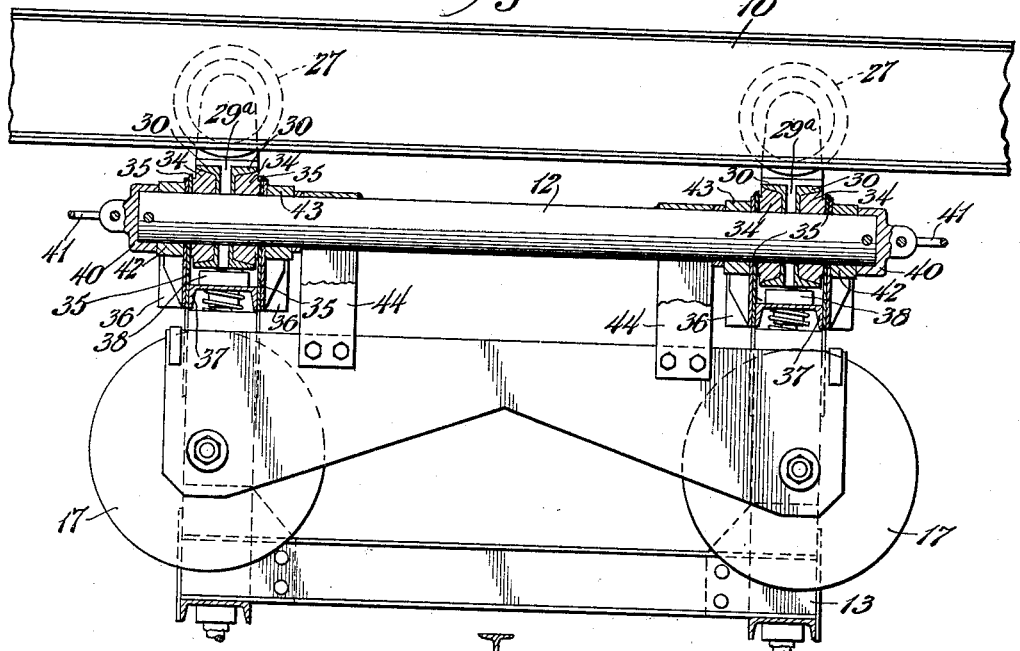
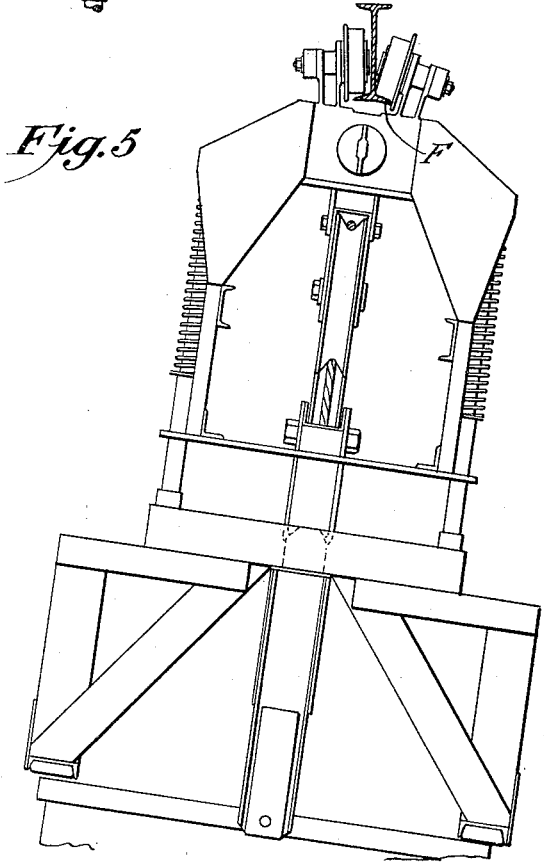
INVENTOR
Paul R. Genzmer
BY Philip E. Siggers
ATTORNEY Patented July 12, 1932

1,867,450

UNITED STATES PATENT OFFICE

PAUL R. GENZMER, OF HUDSON, NEW YORK, ASSIGNOR TO GIFFORD-WOOD COMPANY, OF HUDSON, NEW YORK, A CORPORATION OF NEW YORK

TROLLEY BUCKET CONVEYER

Application filed January 14, 1932. Serial No. 586,625.

This invention relates to trolley bucket conveyers of the type especially adapted to be operated on an overhead monorail, and among other objects, aims to provide an improved trolley structure having means on the trolley to minimize stresses which would otherwise be imparted by the trolley to the monorail during lateral swaying of the trolley; said trolley also having means serving as a resilient stop for the bucket at the end of its hoisting and dampening oscillations of the bucket arising from changes in the velocity thereof during traverse.

In the accompanying drawings, showing a preferred embodiment of the invention:

Fig. 2 is an end elevation of Fig. 1;

Fig. 3 is a separate elevation of the end of the trolley chassis shown in Fig. 2;

Fig. 4 is a side elevation showing a sectional view of the pivot construction by which the trolley carriage is supported from the trolley chassis; and Fig. 5 is an end elevation of a former type of trolley, illustrating the tendency of such a trolley to bend the flanges of the monorail when swinging laterally.

Figure 1:
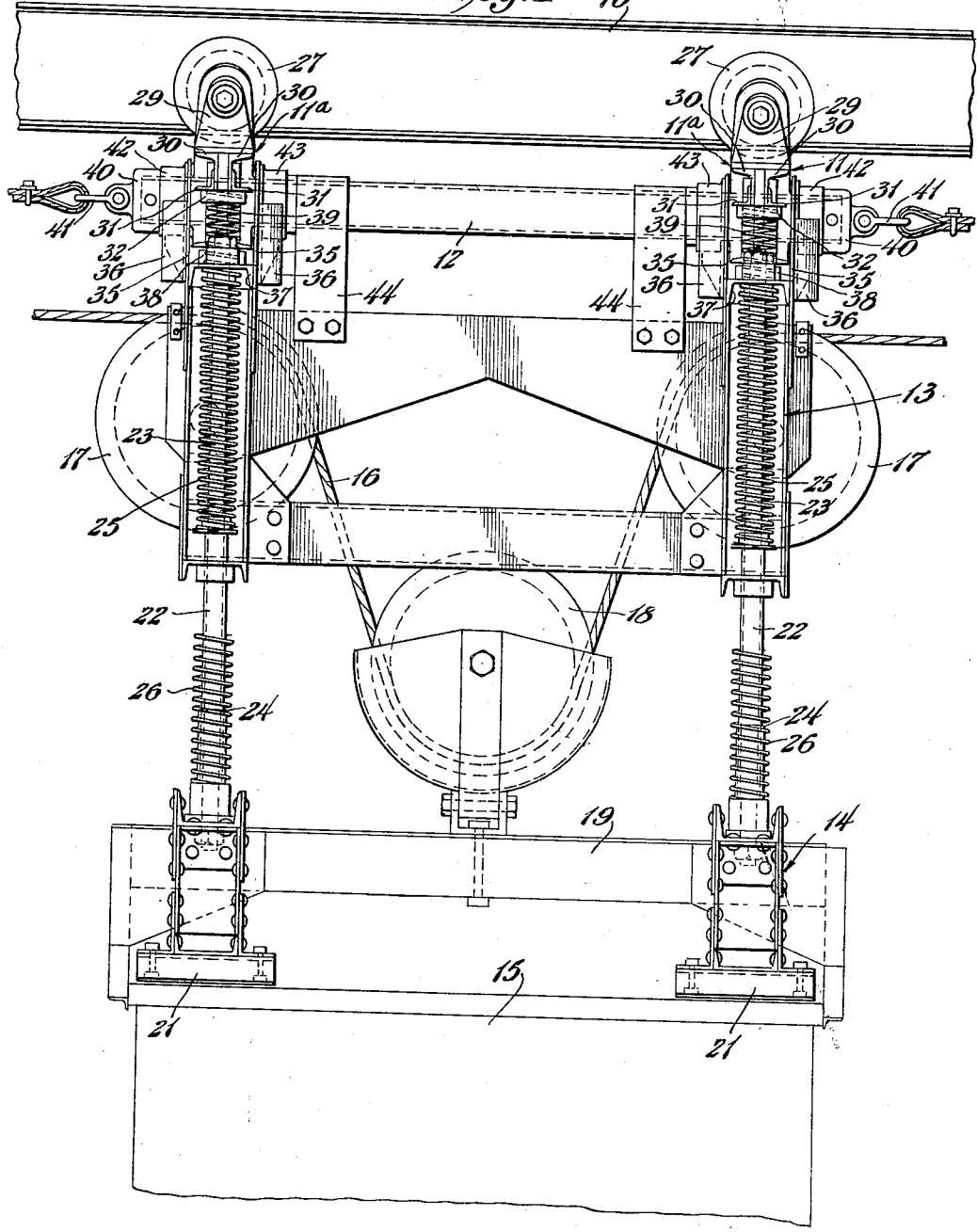
Fig. 1 is a side elevation of the improved trolley bucket conveyer, showing in light lines the upper portion of a bucket held against the lower structure of the trolley.

The present invention is an improvement on the bucket stabilizer described and claimed in the application of W. H. Towne, filed November 8, 1926, Serial No. 146,890, assigned to the assignee of this application.

Referring particularly to Figs. 1 and 2, there is shown an I-beam monorail 10 supporting on its lower flanges a trolley chassis 11. Suspended from a longitudinal pivot bar 12 in the chassis is a trolley carriage 13 having at its ends bucket guiding and holding frames 14 above which bucket stabilizing means are placed, in accordance with the teachings of the aforesaid W. H. Towne application. Thus, when the bucket 15 is hoisted from a loading pit by hoist cable 16 (which is supported by trolley sheaves 17 and which passes under bucket sheave 18), the bail 19 of the bucket is guided into the position shown in Fig. 2 by the inclined guides 20, the upper edges of the bucket strike the buffers 21, and the frames 14 then move upwardly on sleeves 22 and rods 23 compressing the springs 25 and 26, which absorb the shock of stopping. A limit switch (not shown) stops the hoisting movement of the bucket. Thereafter the bucket is held firmly against the trolley and moves with the trolley almost as though rigidly attached to the same, a feature which is claimed in the Hallenbeck Patent No. 1,848,009 dated March 1, 1932.

As explained in the aforesaid W. H. Towne application, the frames 14 are sufficient to restrain the bucket from swinging beneath the trolley in the vertical plane of the monorail. It has been discovered, however, that even with the bucket held rigidly against the trolley, variations in the velocity of the trolley, slight irregularities in the monorail, and other causes, may set the whole trolley to swinging transversely, i. e., in a plane at right angles to the monorail. This transverse swinging will always take place if the bucket, during hoisting, starts to swing in a plane more or less transverse to the plane of the monorail, in which case the bucket, upon contact with the trolley, will continue swinging therewith. This sidewise swinging may cause much trouble, as will now be explained.

In Fig. 5 there is shown a conveyer such as described in the aforesaid W. H. Towne application in which there is no means in the trolley to relieve the stresses induced by this transverse swinging. Thus, in Fig. 5 the trolley is shown as having swayed to the left so that the entire weight of trolley and bucket is supported by the wheels and the flange on the right side. This obviously sets up severe stresses in the trolley frame, wheel brackets, and axles, and tends to twist the monorail. One of the immediate results of these stresses is the bending of the lower flange of the monorail, as shown at F, Fig. 5. This bending is in no wise exaggerated in the drawings. It should be obvious that with one side of the flange bent, the trolley will thereafter sway violently when passing over this section and bend the flange on the other side until the I-beam is ruined as a monorail, necessitating expensive replacements.

In order to relieve the stresses caused by the lateral swaying of the trolley, the present invention provides a resiliently hinged connection between the trolley carriage 13 and the trolley chassis 11, so that if the carriage 13 swings laterally, the chassis 11 will remain in a horizontal position with its wheels squarely seated on the monorail flange, and the swings of the carriage will be quickly dampened. Should the initial swing of the bucket be of magnitude which would lift the wheels (as on the left side of Fig. 5) from the monorail and force these wheels against the web of the monorail, then the springs of the present invention will act as a buffer against the pressure exerted on the monorail flange by the wheels on the other side.

The trolley chassis 11 consists of two trucks 11$^a$, one of which is best shown in Fig. 3, secured at either end to a circular shaft 12, from which the trolley carriage is pivotally suspended. Each truck 11$^a$ has a pair of wheels 27, axles 28, and wheel brackets 29. The wheel brackets 29 are fastened to the top flanges of a cross beam preferably consisting of two channel irons 30, placed back to back but spaced apart slightly by a vertical projection 29$^a$ of the brackets. The channels 30 have portions of their webs and flanges cut away at either end, and angle irons 31 are fastened to both sides of the heavy webs at either end, the lower flanges of which afford horizontal surfaces to which are attached the spring holders 32. The cross beam of channel irons 30 has a hole 33 for the shaft 12, and bearing blocks 34 bolted on both sides of the beam which project outwardly from the web a little farther than the flanges. Thus the two trucks 11$^a$ with the shaft 12 constitute a complete chassis which may maintain a stationary position (so far as lateral movement is concerned) independently of the undercarriage 13.

The undercarriage 13 is pivotally supported at each end from the shaft 12 by triangular hanger plates 35 which are reinforced by the channel sections 36, both pieces being fastened at their lower ends to the horizontal member 37 of the undercarriage and having holes in the top ends for the shaft. The horizontal member 37 also has a pair of spring holders 38 opposite the holders 32 in the end beam of the chassis. In order to control the swinging of the undercarriage from the pivot shaft, vertical coil springs 39 are provided on both sides of the shaft at both ends of the trolley. The springs are held on one end by holders 32 in the chassis frame, and on the other end by holders 38 in the undercarriage, as shown in Fig. 2, and effectively control the swaying of the trolley carriage. Since the center of gravity of the loaded trolley is at a considerable distance below the monorail, the transverse end beams 30 have been provided and made relatively long so that the springs 39 may have relatively long moment arms with respect to the hinge bar and therefore quickly dampen the oscillation of the swaying trolley.

The ends of the shaft 12 are provided with caps 40 pinned to the shaft and having shackles 41 to which are fastened the ends of the trolley line. Bearing blocks 42 are welded to the channel sections 36. Additional bearing blocks 43, welded on the opposite sides of the trucks, also serve to space the sheave straps 44 away from the flanges of the inner channel sections 36.

Another feature of the invention is the provision of springs 26, which, it will be observed, are not compressed until one or both frames 14 are moved upwardly a certain distance, which may be six inches or so in a commercial construction. The springs 26, as stated, supplement the action of springs 25 in resiliently resisting upward movement of frames 14; but they also make the trolley adaptable for checking properly the bucket whether loaded or empty. As previously stated, a limit switch, (not shown) is relied upon to stop hoisting. Supposing that springs 26 are absent, if the bucket is properly stopped when fully loaded, as when it is hoisted from the loading pit, it will not be properly stopped when empty, as when hoisted after dumping its load. The reason for this is that hoisting is effected by an electric motor which is braked by a solenoid brake, not shown. If the limit switch is so set as to act in time for a heavily loaded bucket, it will act too late for the bucket when empty, because the torque load on the brake is then greater, due to the use of a hoist line counterweight (not shown herein, but shown in application Ser. No. 487,628 filed Oct. 9, 1930). Thus stopping of an empty bucket is slower than stopping of a loaded bucket, permitting an empty bucket to move frames 14 farther upwardly than is desirable. The frames 14 might even strike the lower part of the carriage 13, or if sleeves 24 are provided, as shown, said sleeves would strike said carriage, causing a destructive shock, with serious damage almost a certainty, sooner or later.

By the provision of springs 26, pressure is applied to frames 14 to reduce the torque load on the brake by resisting the upward movement of the bucket, thus compensating for the difference in the action of loaded and empty buckets when power is cut off by the limit switch. In other words, the extra load on the hoist cable imposed by the springs 26, when compressed a short distance, is approximately equal to the load of the material which is carried by the bucket when filled. Hence, when springs 26 are provided, the bucket will stop, empty or loaded, with the same setting of the limit switch, within a couple of inches of the same point each time, and without destructive shocks at any time.

Obviously, the present invention is not restricted to the particular embodiment therein shown and described. Moreover, it is not indispensable that all the features of the invention be used conjointly, since they may be employed advantageously in various combinations and sub-combinations.

What I claim is:—

1. A trolley of the type which is adapted to operate suspended from an overhead monorail comprising, in combination, a trolley chassis having wheels on which the trolley can travel along the monorail; a trolley undercarriage depending from and hinged to the chassis; bucket stabilizing, guiding and holding means on the undercarriage by which a bucket suspended from a bail can be hoisted up to the undercarriage and held rigidly against it; resilient means interposed between the undercarriage and the chassis; the carriage thus yielding, independently of the chassis, in planes more or less perpendicular to the vertical plane of the monorail responsive to lateral thrusts on the trolley.

2. A trolley of the class described comprising a trolley chassis and a trolley carriage; said chassis comprising a longitudinal shaft and two trucks mounted on opposite ends of said shaft, each truck having a pair of wheels to roll on the lower flange of an I-beam monorail; said carriage having at its lower ends bucket stabilizing, guiding and holding frames against which a bucket, suspended from a hoist line by a bail and sheave on the bail, may be held in a fixed position relative to the carriage; hanger plates suspending said carriage from the longitudinal shaft of the chassis so that the shaft acts as a hinge pin between the chassis and the carriage about which the carriage and bucket can swing in planes perpendicular to the vertical plane of the monorail; said trolley having spring means interposed between the chassis and carriage which the carriage presses against when swung responsive to lateral thrusts thus obviating any tendency to distort the trolley frame and bend the flanges of the monorail; said trolley having hoisting sheaves on the carriage so that when lateral swinging of the bucket occurs, when the bucket is held against said frames, the bucket sheave and the trolley sheaves may swing about the same axis and therefore remain in the same plane.

3. A trolley of the class adapted to operate suspended from an overhead monorail comprising, in combination, independent constructions of a trolley chassis and trolley undercarriage; hinge means pivotally supporting the undercarriage from the chassis; and means on both sides of the hinge means and interposed between the chassis and undercarriage and spaced considerably away from the vertical plane of the monorail to dampen oscillation of the undercarriage from the hinge bar.

4. A trolley of the class adapted to operate suspended from an overhead monorail comprising, in combination, a trolley chassis; a trolley undercarriage; a hinge bar pivotally supporting the undercarriage from the hinge bar; cross members on both chassis and undercarriage extending outwardly in both directions from the monorail; and springs interposed between the ends of said cross members to dampen lateral swaying of the undercarriage.

5. A trolley having wheels adapted to roll over a flanged monorail from which the trolley depends; said trolley having means providing a longitudinal, horizontal hinge axis beneath the wheels, thus providing relatively movable upper and lower parts; and means interposed between the said upper and lower parts to cushion and dampen oscillations of the lower part of the trolley on said hinge axis, so that stresses arising from side swaying of the trolley are transmitted only when greatly diminished to the flanges of the monorail.

6. A trolley for trolley buckets comprising, in combination, a chassis having rollers; an undercarriage pivotally connected below the chassis and having spring buffer means; a frame depending from and movable relative to the undercarriage; and springs interposed between the frame and undercarriage but normally out of contact with the undercarriage; said springs being movable with the frame so as to be compressed when the frame has been moved upwardly a predetermined distance by the bucket; said last-named springs complementing the action of the spring buffer means and also compensating for the difference in stopping action of a loaded and an empty bucket.

7. A trolley for trolley buckets comprising, in combination, an undercarriage; wheeled means for supporting the undercarriage and from which the undercarriage depends; a bucket-engaged frame carried by and below the undercarriage and movable relative thereto; means interposed between the frame and undercarriage to absorb part of the shock when the bucket encounters the frame and to assist in bringing the bucket to a stop; and complemental buffer means also interposed between the frame and undercarriage but normally inactive, said complemental means becoming active to resist upward movement of the bucket after the bucket has moved the frame upwardly a certain distance.

8. A trolley for trolley buckets comprising, in combination, an undercarriage and a frame carried below and movable vertically relative to the undercarriage; shock-absorbing means interposed between the frame and undercarriage and acting on the frame to resist immediately any upward movement thereof caused by the bucket; and complemental shock-absorbing means interposed between the frame and undercarriage but normally inactive; the parts being so constructed and arranged that when the bucket has moved the frame upwardly a certain distance against the first named shock-absorbing means, the complemental shock-absorbing means become active.

In testimony that I claim the foregoing as my own, I have hereto affixed my signature.

PAUL R. GENZMER.